Patented Jan. 20, 1953

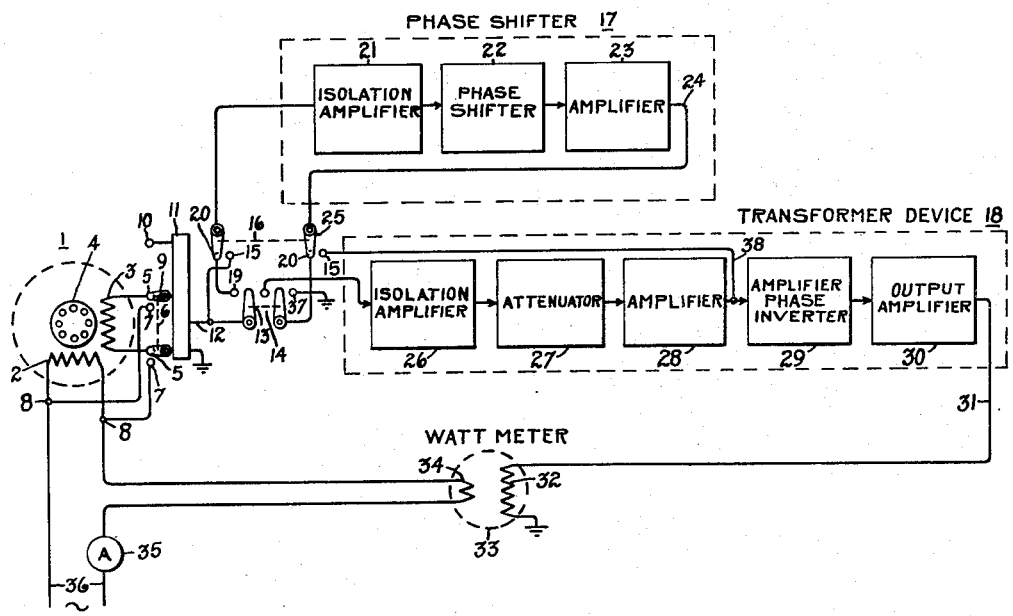

2,626,307

UNITED STATES PATENT OFFICE 2,626,307

MOTOR TESTING DEVICE

Fred W. Suhr, Fort Wayne, Ind., and Martin W. Hellar, Jr., Schenectady, N. Y., assignors to General Electric Company, a corporation of New York Application November 16, 1951, Serial No. 256,674

16 Claims. (Cl. 175—183)

This invention relates to electrical measuring equipment for testing single phase alternating current motors and more particularly to a device for measuring the mutual reactance between the main primary and secondary windings of the motor, the output torque of the motor, and additionally for measuring the reactance of any reactive device.

Mathematical studies of single phase alternating current motor performance have shown the desirability of electrically measuring the mutual reactance between the primary and secondary windings, and also the output torque of the motor. Furthermore, it is also desirable to electrically measure the reactance of any reactive device such as the main winding of a single phase alternating current motor.

It is, therefore, an object of this invention to provide a device for testing single phase alternating current motors which will measure the mutual reactance between the primary and secondary windings, the output torque of the motor, and which will also measure the reactance of any reactive device.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects includes phase shifting means arranged to shift any voltage impressed thereon by 90°, voltage transformation means selectively adjustable to increase or decrease a voltage impressed thereon and having an overall gain or attenuation inversely proportional to the ratio of turns between the main and starting winding of the motor, and a wattmeter. Switching means are provided having three positions, the first connecting the open circuited starting winding of the motor to the input of the phase shifting means and the output thereof to the transformation device, the output of the transformation device being in turn connected to the potential coil of the wattmeter with the current coil thereof being connected in series with the main or running winding of the motor. Thus, the phase shifting means shifts the induced voltage in the open circuited starting winding by 90° and the transformation device compensates for the effective ratio of turns between the main and starting winding. By reading the wattmeter when the motor is running at no load and again at full load, the torque output can be measured. In the second switch position, the starting winding of the motor is connected directly to the input of the transformation device and the output thereof is connected to the potential coil of the wattmeter with the current coil of the meter being again connected in series with the main winding of the motor. With this connection, the mutual reactance between the primary and secondary windings is measured by the wattmeter, together with the motor input reactive watts. In the third position of the switch, the input of the phase shifting means is connected across either winding, or any other reactive device and the output of the phase shifting means is connected to the potential coil of the wattmeter, the current coil being connected in series with the winding or device. With this connection, the wattmeter indicates the reactance of the device to which connected.

In the drawing, Fig. 1 is a schematic illustration of the improved motor testing device of this invention; Fig. 2 illustrates schematically the connection for measuring mutual reactance between the main primary and secondary windings of the motor; Fig. 3 schematically illustrates the connection for measuring the torque output of the motor; and Fig. 4 schematically illustrates the connection for measuring the reactance of the main winding of the motor.

Referring now to Fig. 1, there is shown a single phase alternating current induction motor 1 having a main primary or running winding 2, a starting winding 3 and a squirrel cage rotor or secondary winding 4. Utilizing the improved testing device of this motor, the starting winding 3 is disconnected from its usual connection, i. e. open circuited, and is brought out to positions 5 of double pole, double throw switch 6, the switch 6 being also provided with second positions 7 which are connected across the main winding 2 as at 8. The movable elements of the switch 6 are connected to either the low side 9 or high side 10 of attenuator 11 depending upon the maximum input voltage. The attenuator 11, which may be a simple voltage divider, attenuates the voltage impressed thereon by a predetermined ratio for ease of handling in the electronic circuits to be hereinafter described. In a device actually constructed by the assignee of this application, the low voltage tap of the voltage divider was used where less than 150 R. M. S. volts to be applied and the high voltage tap used for higher voltages with an attenuation ratio of 20 to 1 on the low voltage tap and 40 to 1 with the high voltage tap.

For either tap position, the voltage divider presents a constant resistance to the winding under test and limits the current therein to less than 1 milliampere.

The output 12 of the voltage divider 11 is connected to the movable element 13 of double pole, double throw switch 14 and also to position 15 of double pole, double throw switch 16. The switches 14 and 16 permit the phase shifting device 17, and the voltage transformation device 18 to be used in various combinations to perform various measurements, as will be hereinafter described. With the switch 14 in its first position 19 and with the switch 16 in its first position 20, the signal from the voltage divider 11 is applied to the 90° phase shifting device 17 which includes an isolation amplifier 21, a phase shift network 22, and a final amplifier 23. It is preferable that the overall gain of the phase shifting device 17 be one and in the device actually constructed, the gain of the isolation amplifier was one, the phase shift network 22 had an attenuation of three to one, and the amplifier 23 had a gain of three giving a net overall gain of one.

The output 24 of the phase shifting device 17 is connected to the movable element 25 of the switch 16 and with the switch 16 in its first position 20 and the switch 14 also in its first position 19, the signal from the phase shifting device 17 will be impressed upon the voltage transformation device 18. The transformation device 18 is used to give the signal the proper amplitude to compensate for the effective ratio of turns between the main winding 2 and the starting winding 3 of the motor 1. The voltage transformation device 18 includes an isolation amplifier 26 which in turn feeds selectively adjustable attenuator 27, amplifier 28, amplifier and phase inverter 29, and output amplifier 30. In the device actually constructed, the isolation amplifier had a gain of one, the attenuator 27 a maximum attenuation of one thousand to one, the amplifier 28 a fixed gain of three, the amplifier phase inverter 29 a fixed gain of 6.66 and the output amplifier 30 a fixed gain of three. The attenuator 27 is arranged to provide a selectively variable attenuation from one to one down to one thousand to one and it will, therefore, be readily seen that the voltage impressed upon the transformation device 18 can be attenuated to a maximum of substantially three hundred to one, or amplified to a maximum of substantially one to three to accommodate a wide range of turn ratios of the motor 1. Since the voltage impressed upon the voltage divider 11 was attenuated by either twenty or forty to one, the signal from the amplifier 28 is too small by that amount and, therefore, it is amplified by amplifiers 29 and 30. In the device actually constructed, the amplifier 29 had a fixed gain of 6.6 and the output amplifier 30 a fixed gain of three to provide a net gain of twenty, the amplifier 29 being used to drive a push-pull type amplifier 30. It will be readily understood that either a single stage amplifier, or an amplifier having a multiplicity of stages can be used as long as the overall gain is equivalent to the attenuation of the voltage divider 11.

The output 31 of the output amplifier 30 is connected to the potential coil 32 of wattmeter 33 and the current coil 34 is connected in series with the running winding 2 of the motor 1. An ammeter 35 is conveniently arranged in series with the main winding 2 and the winding is energized from any suitable source of alternating current (not shown) by lines 36. The wattmeter 33 is preferably a 150–300 volt meter, thus permitting the 150 volt potential coil to be connected at all times. Thus, when the voltage divider 11 is connected on the high tap, the high range is read on the wattmeter 33 rather than the low range which is read when the voltage divider 11 is connected on the low tap. The isolation amplifiers 21 and 26, phase shift network 22, the attenuator 27, and the amplifiers 23, 28, 29 and 30 are conventional devices well known in the art and their individual circuits do not form a part of this invention. The connection described immediately above is shown more schematically in Fig. 3 and, as will be hereinafter described, by reading the wattmeter 33 with the motor running at no load and again with the motor running loaded, the output torque may be readily determined.

If it is desired to utilize the device to measure mutual reactance, the voltage transformation device 18 is used alone as shown schematically in Fig. 2. Referring again to Fig. 1, to measure mutual reactance between the primary winding 2 and the secondary winding 4, the switch 6 remains in its first position 5 so that the induced voltage in the open circuited starting winding 3 is impressed upon the attenuator 11. In this case, however, the switch 14 is moved to its second position 37 and it will be readily seen that the output 12 of the attenuator 11 is now directly impressed upon the transformation device 18 with the output 31 thereof being connected to the potential coil 32 of the wattmeter 33 and the current coil 34 thereof being connected in series with the main winding 2.

If it is desired to measure the reactance of the running winding 2 of the motor 1, or for that matter the reactance of any reactive device, the connection shown in Fig. 4 is used with the phase shifting device 17 connected directly across the main winding 2 and its output connected to the potential coil 32 of the wattmeter 33 with the current coil 34 thereof again connected in series with the main winding 2. Referring again to Fig. 1, to secure the connection of Fig. 4, the switch 6 is moved to its second position 7 connecting the voltage divider 11 across the main winding 2. Here, the switch 14 is left in a neutral position as shown in Fig. 1 and the switch 16 is moved to its second position 15. It will now be seen that the output 12 of the voltage divider 11 is fed through the switch 16 to the phase shifting device 17 and the output 24 thereof is fed to the input of the amplifier phase inverter 29 and the output amplifier 30 through the line 38. It will be readily apparent that a single selector switch can replace switches 6, 14, and 16.

The theory of operation of the device described above is as follows: The R. M. S. induced voltage in the starting winding of a single phase alternating current motor with the starting winding open circuited as given by the following equation:

$$E_s = aI_M\left[-\left(\frac{X_{2f}}{2}-\frac{X_{2b}}{2}\right)+j\left(\frac{R_{2f}}{2}-\frac{R_2b}{2}\right)\right]$$

where $E_s$ = induced voltage in the starting winding (a vector)
$a$ = effective conductor ratio of the starting winding to the main winding
$I_M$ = input current to the main winding (a vector)
$X_{2f}$ = apparent forward field secondary reactance (referred to the primary)

$X_{2b}$ = apparent backward field secondary reactance (referred to the primary)
$R_{2f}$ = apparent forward field secondary resistance (referred to the primary)
$R_{2b}$ = apparent backward field secondary resistance (referred to the primary)

If a voltage $E_s/a$ is applied to a wattmeter potential coil and the current $I_M$ flows through the current coil, the meter will read a value of:

$$-I_M^2\left(\frac{X_{2f}}{2} - \frac{X_{2b}}{2}\right) \text{ watts} = {}_zW$$

So that we can measure $$\left(\frac{X_{2f}}{2} - \frac{X_{2b}}{2}\right) = \frac{{}_zW}{I_M^2}$$

knowing $_zW$ and $I_M$.

Thus we see that with the transformation device 18 used alone, as shown in Fig. 2, the mutual reactance between the main primary winding and the secondary windings can be closely approximated.

Multiplying the first equation presented above through by minus $j/a$ yields.

$$-j/aE_s = I_M\left[\left(\frac{R_{2f} - R_{2b}}{2}\right) + j\left(\frac{X_{2f} - X_{2b}}{2}\right)\right]$$

If the voltage $-j/aE_s$ (the voltage $E_s$ induced in the starting winding rotated $-90°$ and transformed by a $1/a$ ratio) is applied to a wattmeter potential coil and the current $I_M$ flows through the current coil, the meter will read a value of $$I_M^2\left(\frac{R_{2f} - R_{2b}}{2}\right) \text{ watts} = {}_vW$$

The power output of a single phase motor (starting winding circuit—open circuited) is given by $$WO = I_M^2\left(\frac{R_{2f} - R_{2b}}{2}\right)(1 - S) - W_{if}$$

where
$WO$ = power output in watts
$S$ = per unit slip
$W_{if}$ = watts power loss due to friction and iron loss or torque in oz. ft. is $$\frac{WO \times 112.7}{(1-S) \text{ Synch.}} = T \text{ oz. ft.}$$

where Synch. = synchronous R. P. M. of the motor

Thus, from the last two equations, the following is derived $$T = 112.7 \left[\frac{I_M^2\left(\frac{R_{2f} - R_{2b}}{2}\right)(1-S)}{(1-S) \text{ Synch.}} - \frac{W_{if}}{(1-S) \text{ Synch.}}\right] \text{oz. ft.}$$

or $$T = 112.7\left[\frac{{}_vW}{\text{Synch.}} - \frac{W_{if}}{RPM}\right] \text{oz. ft.}$$

The second term of this equation is usually quite small and can often be neglected. However, it can be evaluated quite readily if the motor is allowed to run without a connected load and in that case the entire output is $W_{if}$. By reading the wattmeter at no load and the gain at desired load, the load torque becomes $$T = \frac{112.7}{\text{Synch.}}({}_vW - {}_vW_0) \text{ oz. ft.}$$

Thus it is seen that with the connection of Fig. 3 and the meter 33 read at no load and at full load the torque output of the motor can be measured.

It will be readily apparent that any linear reactance may be accurately measured if a wattmeter can be made to read reactive watts. Thus by shifting the voltage phase 90° with respect to the current, the wattmeter reads reactive watts so that $$X = \frac{{}_zW}{I^2} \text{ ohms}$$

where $W$ = the watts reading when $jE$ is applied to the potential coil and $I$ flows through the current coil. Thus, we see that with the connection of Fig. 4, the reactance of the main winding 2, or of any other reactive device can be read on the wattmeter 33.

To summarize, this improved motor testing device utilizes a phase shifting device arranged to shift the phase of the applied voltage by 90° with an overall gain of one, and a transformation device 18 which has its internal attenuators so arranged that the ratio of the applied voltage to the voltage output can be selectively varied from a maximum attenuation of three hundred to one, to a maximum amplification of one to three in order to compensate for the ratio of turns of the running winding 2 to the starting winding 3. In order to measure the torque of the motor 1, the starting winding 3 is connected to the attenuator 11 which attenuates the induced voltage on the open circuited starting winding to a value which can be handled by the amplifier circuits to follow. This signal is shifted 90° by the phase shifting device 17 to compensate for the 90° mechanical displacement of the starting winding 3 with respect to the running winding 2, and the signal is further increased or decreased by the attenuator-amplifier combination 27 and 28 by a gain inversely proportional to the ratio turns of the running winding 2 to the starting winding 3. For example, if the main winding 2 and the starting winding 3 have a turn ratio of three to one, the attenuator 27 would be adjusted for a one to one attenuation so that the amplifier 28 would provide a one to three amplification. Conversely, if the ratio of turns of the main winding 2 and the starting winding 3 is one to three, the attenuator 27 will be adjusted for the maximum attenuation of ten to one so that when the signal passes through the fixed gain amplifier 28, the net overall attenuation will be three to one. After passing through the attenuator-amplifier combination 27 and 28, the signal is then again amplified by the amplifier combination 29 and 30 with the gain being substantially equal to the attenuation of the attenuator 11. The resultant 90° phase shifted voltage of the starting winding 3, corrected for the turn ratio between the main winding 2 and running winding 3, is then applied to the potential coil 32 of the wattmeter 33 and the current in the main winding 2 is passed through the current coil 34 so that the torque can be read by reading the wattmeter 33 at no load to subtract the tare consisting of friction and iron loss and by reading the wattmeter again at full load. It will be noted that only a very small current is required from the starting winding to operate the device, i. e., less than one milliampere.

It will be seen that this device, when connected as shown in Fig. 2, is a valuable tool for the motor designer for measuring the mutual reactance from the primary winding to the secondary winding. Here, the 90° phase shift provided by the phase shifting device is not used, but the compensation for the turn ratio between the main winding 2 and the running winding 3 is provided with the transformation device 18 having its input connected to the open circuited starting winding 3 and its output connected to the potential coil 32 of the wattmeter 33. The device is also useful for direct and accurate measurement of reactance and is connected as shown in Fig. 4 with the current to the reactive device, such as the main winding 2, flowing through the current coil 34 of the wattmeter 33 and the voltage across the reactive device being shifted by 90°, the phase shifting device 17 thus making the wattmeter 33 read reactive instead of real watts. By such a direct reading device, the reactance can be measured accurately by dividing this wattage reading by the square of the input current.

The power supplies for the various amplifier, phase shifter, and attenuator stages are not shown. However, it will be readily understood that any conventional power supplies suitable for the particular amplifier circuit selected may be used.

While we have shown and described a particular embodiment of this invention, further modifications and improvements will occur to those skilled in the art. We desire it to be understood, therefore, that this invention is not limited to the form shown and we intend in the appended claims to cover all modifications which do not depart from the spirit and scope of this invention.

What we claim as new and desire to secure by Letters Patent of the United States is:

1. A device for testing a single phase alternating current motor comprising phase shifting means arranged to shift the voltage impressed thereon by 90°, voltage transformation means selectively adjustable to increase or decrease the voltage impressed thereon inversely proportional to the ratio of turns of the main primary and starting windings of said motor, a wattmeter having its potential coil connected to the output of said voltage transformation means and its current coil adapted to be connected in series with said main primary winding of said motor, and switching means having a first position adapted to connect the open circuited starting winding to the input of said phase shifting means and the output of said phase shifting means to the input of said voltage transformation means whereby said wattmeter measures the power output of said motor, said switching means having a second position adapted to connect said open circuited starting winding directly to the input of said voltage transformation means whereby said wattmeter measures the mutual reactance between said main primary winding and the secondary winding of said motor.

2. A device for testing a single phase alternating current motor comprising phase shifting means arranged to shift the voltage impressed thereon by 90° and having an overall gain of one, voltage transformation means selectively adjustable to increase or decrease the voltage impressed thereon and having an overall gain or attenuation inversely proportional to the ratio of turns of the main primary and starting windings of said motor, a wattmeter having its potential coil connected to the output of said voltage transformation means and its current coil adapted to be connected in series with said main primary winding of said motor, and switching means having a first position adapted to connect the open circuited starting winding to the input of said phase shifting means and the output of said phase shifting means to the input of said voltage transformation means whereby said wattmeter measures the power output of said motor, said switching means having a second position adapted to connect said open circuited starting winding directly to the input of said voltage transformation means whereby said wattmeter measures the mutual reactance between said main primary winding and the secondary winding of said motor.

3. A device for testing a single phase alternating current motor comprising attenuating means adapted to be connected across the open circuited starting winding of said motor, phase shifting means arranged to shift the voltage impressed thereon by 90°, voltage transformation means selectively adjustable arranged to increase or decrease the voltage impressed thereon inversely proportional to the ratio of turns of the main primary and starting windings of said motor, amplifying means having its input connected to the output of said voltage transformation means, a wattmeter having its potential coil connected to the output of said amplifying means and its current coil adapted to be connected in series with said main primary winding of said motor, and switching means having a first position connecting the output of said attenuating means to the input of said phase shifting means and the output of said phase shifting means to input of said voltage transformation means whereby said wattmeter measures the power output of said motor, said switching means having a second position connecting the output of said attenuating means directly to the input of said voltage transformation means whereby said wattmeter measures the mutual reactance between said main primary winding and the secondary winding of said motor.

4. A device for testing a single phase alternating current motor comprising attenuating means adapted to be connected across the open circuited starting winding of said motor and having a predetermined attenuation, phase shifting means arranged to shift the voltage impressed thereon by 90° and having an overall gain of 1, voltage transformation means selectively adjustable to increase or decrease the voltage impressed thereon and having an overall gain or attenuation inversely proportional to the ratio of turns of the main primary winding and starting winding of said motor, amplifying means having its input connected to the output of said voltage transformation means and having an overall gain equal to the attenuation of said attenuating means, a wattmeter having its potential coil connected to the output of said amplifying means and its current coil adapted to be connected in series with said main primary winding of said motor, and switching means having a first position connecting the output of said attenuating means to the input of said phase shifting means and the output of said phase shifting means to the input of said voltage transformation means whereby said wattmeter measures the power output of said motor, said switching means having a second position connecting the output of said attenuating means directly to the input of said voltage transformation means whereby said wattmeter measures the mutual reactance between said main primary winding and the secondary winding of said motor.

5. A device for testing a single phase alternating current motor comprising attenuating means adapted to be connected across the open circuited starting winding of said motor and having a predetermined attenuation, phase shifting means arranged to shift the voltage impressed thereon by 90° and having an overall gain of one; said phase shifting means including an isolation amplifier, a phase shift network, and a final amplifier; voltage transformation means selectively adjustable to increase or decrease the voltage impressed thereon and having an overall gain or attenuation inversely proportional to the ratio of turns of the main primary winding and starting winding of said motor; said transformation means including an isolation amplifier, an attenuator, and a final amplifier; an output amplifier having its input connected to the output of said voltage transformation means and having an overall gain equal to the attenuation of said first-mentioned attenuating means, a wattmeter having its potential coil connected to the output of said output amplifier and is current coil adapted to be connected in series with said main primary winding of said motor, and switching means having a first position connecting the output of said attenuating means to the input of said phase shifting means and the output of said phase shifting means to the input of said voltage transformation means whereby said wattmeter measures the power output of said motor, said switching means having a second position connecting the output of said attenuating means directly to the input of said voltage transformation means whereby said wattmeter measures the mutual reactance between said main primary winding and the secondary winding of said motor.

6. A device for testing a single phase alternating current motor comprising phase shifting means arranged to shift the voltage impressed thereon by 90°, attenuating means selectively adjustable to decrease the voltage impressed thereon inversely proportional to the ratio of turns of the main primary and starting windings of said motor, a wattmeter having its potential coil connected to the output of said attenuating means and its current coil adapted to be connected in series with said main primary winding of said motor, and switching means having a first position adapted to connect the open circuited starting winding to the input of said phase shifting means and the output of said phase shifting means to the input of said attenuating means whereby said wattmeter measures the power output of said motor, said switching means having a second position adapted to connect said open circuited starting winding directly to the input of said attenuating means whereby said wattmeter measures the mutual reactance between said main primary winding and the secondary winding of said motor.

7. A device for testing a single phase alternating current motor comprising phase shifting means arranged to shift the voltage impressed thereon by 90°, amplifying means selectively adjustable to increase the voltage impressed thereon inversely proportional to the ratio of turns of the main primary and starting windings of said motor, a wattmeter having its potential coil connected to the output of said amplifying means and its current coil adapted to be connected in series with said main primary winding of said motor, and switching means having a first position adapted to connect the open circuited starting winding to the input of said phase shifting means and the output of said phase shifting means to the input of said amplifying means whereby said wattmeter measures the power output of said motor, said switching means having a second position adapted to connect said open circuited starting winding directly to the input of said amplifying means whereby said wattmeter measures the mutual reactance between said main primary winding and the secondary winding of said motor.

8. A device for testing a single phase alternating current motor comprising voltage transformation means selectively adjustable to increase or decrease the voltage impressed thereon and having an overall gain or attenuation inversely universally proportional to the ratio of turns of the main primary and starting windings of said motor, said transformation means having its input adapted to be connected to the open circuited starting winding, and a wattmeter having its potential coil connected to the output of said voltage transformation means and its current coil adapted to be connected in series with said main primary winding of said motor whereby said wattmeter measures the mutual reactance between said main primary winding and the secondary winding of said motor.

9. A device for testing a single phase alternating current motor comprising attenuating means adapted to be connected across the open circuited starting winding of said motor, voltage transformation means selectively adjustable to increase or decrease the voltage impressed thereon inversely proportional to the ratio of turns of the main primary and starting windings of said motor and having its input connected to the output of said attenuating means, amplifying means having its input connected to the output of said voltage transformation means, and a wattmeter having its potential coil connected to the output of said amplifying means and its current coil adapted to be connected in series with said main primary winding of said motor whereby said wattmeter measures the mutual reactance between said main primary winding and the secondary winding of said motor.

10. A device for testing a single phase alternating current motor comprising attenuating means adapted to be connected across the open circuited starting winding of said motor and having a predetermined attenuation, voltage transformation means selectively adjustable to increase or decrease the voltage impressed thereon and having an overall gain or attenuation inversely proportional to the ratio of turns of the main primary winding and starting winding of said motor, said transformation means having its input connected to the output of said attenuating means, amplifying means having its input connected to the output of said voltage transformation means and having an overall gain equal to the attenuation of said attenuating means, a wattmeter having its potential coil connected to the output of said amplifying means and its current coil adapted to be connected in series with said main primary winding of said motor whereby said wattmeter measures the mutual reactance between said main primary winding and the secondary winding of said motor.

11. A device for testing a single phase alternating current motor comprising attenuating means adapted to be connected across the open circuited starting winding of said motor and having a predetermined attenuation, voltage transformation means selectively adjustable to increase or decrease the voltage impressed thereon and having an overall gain or attenuation inversely proportional to the ratio of turns of the main primary winding and starting winding of said motor, said transformation means having its input connected to the output of said attenuating means; said voltage transformation means including an isolation amplifier, an attenuator, and a final amplifier; an output amplifier having its input connected to the output of said voltage transformation means and having an overall gain equal to the attenuation of said attenuating means, and a wattmeter having its potential coil connected to the output of said output amplifier and its current coil adapted to be connected in series with said main primary winding of said motor whereby said wattmeter measures the mutual reactance between said main primary winding and the secondary winding of said motor.

12. A device for testing a single phase alternating current motor comprising phase shifting means arranged to shift the voltage impressed thereon by 90°, voltage transformation means selectively adjustable to increase or decrease the voltage impressed thereon inversely proportional to the ratio turns of the main primary and starting windings of said motor, a wattmeter having its current coil adapted to be connected in series with said main primary winding of said motor; and switching means having a first position adapted to connect the open circuited starting winding to the input of said phase shifting means and connecting the output of said phase shifting means to the input of said voltage transformation means and the output of voltage transformation means to the potential coil of said wattmeter whereby said wattmeter measures the power output of said motor; said switching means having a second position adapted to connect said open circuited starting winding directly to the input of said voltage transformation means and connecting the output thereof to said potential coil of said wattmeter whereby said wattmeter measures the mutual reactance between said main primary winding and the secondary winding; said switching means having a third position adapted to connect the input of said phase shifting means across said main primary winding and connecting the output of said phase shifting means to said potential coil of said wattmeter whereby said wattmeter measures the reactance of said main primary winding.

13. A device for testing a single phase alternating current motor comprising phase shifting means arranged to shift the voltage impressed thereon by 90° and having an overall gain of 1, voltage transformation means selectively adjustable to increase or decrease the voltage impressed thereon and having an overall gain or attenuation inversely proportional to the ratio of turns of the main primary and starting windings of said motor, a wattmeter having its current coil adapted to be connected in series with said main primary winding of said motor; and switching means having a first position adapted to connect the open circuited starting winding to the input of said phase shifting means and connecting the output of said phase shifting means to the input of said voltage transformation means and the output of said voltage transformation means to the potential coil of said wattmeter whereby said wattmeter measures the torque output of said motor; said switching means having a second position adapted to connect said open circuit starting winding directed to the input of said voltage transformation means and connecting the output thereof to said potential coil of said wattmeter whereby said wattmeter measures the mutual reactance between said main primary winding and the secondary winding; said switching means having a third position adapted to connect the input of said phase shifting means across said main primary winding and connecting the output of said phase shifting means to said potential coil of said wattmeter whereby said wattmeter measures the reactance of said main primary winding.

14. A device for testing a single phase alternating current motor comprising attenuating means, phase shifting means arranged to shift the voltage impressed thereon by 90°, voltage transformation means selectively adjustable to increase or decrease the voltage impressed thereon inversely proportional to the ratio of turns in the main primary and starting windings of said motor, amplifying means, a wattmeter having its potential coil connected to the output of said amplifying means and its current coil adapted to be connected in series with said main primary winding of said motor; and switching means having a first position adapted to connect said attenuating means across the open circuited starting winding and connecting the output of said attenuating means to the input of said phase shifting means, the output of said phase shifting means to the input of said voltage transformation means, and the output of said voltage transformation means to the input of said amplifying means, whereby said wattmeter measures the torque output of said motor; said switching means having a second position adapted to connect said attenuating means across said open circuited starting winding, and connecting the output of said attenuating means directly to the input of said voltage transformation means, and the output of said voltage transformation means to the input of said amplifying means whereby said wattmeter measures the mutual reactance between said main primary winding and the secondary winding; said switching means having a third position adapted to connect said attenuator across said main primary winding, and connecting the output of said attenuator to the input of said phase shifting means, and the output of said phase shifting means to the input of said amplifying means whereby said wattmeter measures the reactance of said main primary winding.

15. A device for testing a single phase alternating current motor comprising attenuating means having a predetermined attenuation, phase shifting means arranged to shift the voltage impressed thereon by 90° and having an overall gain of 1, voltage transformation means selectively adjustable to increase or decrease the voltage impressed thereon and having an overall gain or attenuation inversely proportional to the ratio of turns of the main primary winding and starting winding of said motor, amplifying means having an overall gain equal to the attenuation of said attenuating means, a wattmeter having its potential coil connected to the output of said wattmeter and its current coil adapted to be connected in series with said main primary winding of said motor; and switching means having a first position adapted to connect said attenuating means across the open circuited starting winding, and connecting the output of said attenuating means to the input of said phase shifting means, the output of said phase shifting means to the input of said voltage transformation means, and the output of said voltage transformation means to the input of said amplifying means whereby said wattmeter measures the torque output of said motor; said switching means having a second position adapted to connect said attenuating means across said open circuited starting winding and connecting the output of said attenuating means directly to the input of said voltage transformation means, and the output of said voltage transformation means to the input of said amplifying means whereby said wattmeter measures the mutual reactance between said main primary winding and the secondary winding of said motor; said switching means having a third position adapted to connect said attenuator to the input of said phase shifter, and the output of said phase shifter to the input of said amplifying means whereby said wattmeter measures the reactance of said main primary winding.

16. A device for testing single phase alternating current motor comprising attenuating means having a predetermined attenuation, phase shifting means arranged to shift the voltage impressed thereon by 90° and having an overall gain of one, voltage transformation means selectively adjustable to increase or decrease the voltage impressed thereon and having an overall gain or attenuation inversely proportional to the ratio of turns of the main primary winding and starting windings of said motor; said phase shifting means including an isolation amplifier, a phase shift network, and a final amplifier; an output amplifier, and a wattmeter having its potential coil connected to the output of said output amplifier and its current coil adapted to be connected in series with said main primary winding of said motor; and switching means having a first position adapted to connect said first attenuating means across the open circuited starting winding, and connecting the output of said attenuating means to the input of said phase shifting means, the output of said phase shifting means to the input of said voltage transformation means, and the output of said voltage transformation means to the input of said output amplifier whereby said wattmeter measures the torque output of said motor; said switching means having a second position adapted to connect said attenuating means to said open circuited starting winding and connecting the output of said attenuating means directly to the input of said voltage transformation means, and the output of said voltage transformation means to the input of said output amplifier whereby said wattmeter measures the mutual reactance between said main primary winding and the secondary winding; said switching means having a third position adapted to connect said attenuating means across said main primary winding of said motor, and connecting the output of said attenuating means to the input of said phase shifting means, and the output of said phase shifting means to the input of said output amplifier whereby said wattmeter measures the reactance of said main primary winding.

FRED W. SUHR.
MARTIN W. HELLAR, JR.

REFERENCES CITED

The following references are of record in the file of this patent:

UNITED STATES PATENTS

| Number | Name | Date |
|---|---|---|
| 1,960,614 | Anderson | May 29, 1934 |
| 2,111,135 | Bagno | Mar. 15, 1938 |
| 2,316,153 | Brown | Apr. 13, 1943 |